(12) United States Patent
Tobe et al.

(10) Patent No.: US 7,096,782 B2
(45) Date of Patent: Aug. 29, 2006

(54) DRIVING APPARATUS IN PRINTING PRESS

(75) Inventors: Koichi Tobe, Ibaraki (JP); Hideaki Watanabe, Ibaraki (JP)

(73) Assignee: Komori Corporation, Sumida-Ku (JP)

( * ) Notice: Subject to any disclaimer, the term of this patent is extended or adjusted under 35 U.S.C. 154(b) by 97 days.

(21) Appl. No.: 10/898,090

(22) Filed: Jul. 23, 2004

(65) Prior Publication Data

US 2005/0016396 A1    Jan. 27, 2005

(30) Foreign Application Priority Data

Jul. 24, 2003    (JP) .............................. 2003/200996

(51) Int. Cl.
*B41F 13/00*    (2006.01)
*B41F 5/00*    (2006.01)

(52) U.S. Cl. ...................... 101/212; 101/177; 101/211; 101/216; 101/219; 101/350.4; 476/21; 476/24; 476/25; 476/26

(58) Field of Classification Search ................ 101/216, 101/212, 211, 177, 219, 350.4, 483; 471/21, 471/24, 25, 26
See application file for complete search history.

(56) References Cited

U.S. PATENT DOCUMENTS

| | | | | |
|---|---|---|---|---|
| 4,351,236 A | * | 9/1982 | Beisel et al. | 101/148 |
| 4,394,835 A | * | 7/1983 | Gertsch et al. | 101/177 |
| 4,798,137 A | * | 1/1989 | Hermach et al. | 101/211 |
| 5,025,723 A | * | 6/1991 | Abendroth et al. | 101/148 |
| 5,447,101 A | * | 9/1995 | Weis | 101/219 |
| 5,706,728 A | * | 1/1998 | Motard et al. | 101/247 |
| 5,713,280 A | * | 2/1998 | Kelm et al. | 101/142 |
| 5,823,109 A | * | 10/1998 | Hummel et al. | 101/350.4 |
| 6,293,194 B1 | * | 9/2001 | Vrotacoe | 101/248 |
| 6,327,975 B1 | * | 12/2001 | Izawa | 101/170 |
| 6,490,972 B1 | * | 12/2002 | Aoyama et al. | 101/177 |
| 6,634,292 B1 | * | 10/2003 | Fujiwara et al. | 101/141 |
| 6,647,875 B1 | * | 11/2003 | Horikoshi | 101/216 |
| 6,810,809 B1 | * | 11/2004 | Detmers et al. | 101/483 |
| 2002/0096067 A1 | * | 7/2002 | Kitai | 101/216 |

FOREIGN PATENT DOCUMENTS

JP    2537504    3/1997

* cited by examiner

*Primary Examiner*—Daniel J. Colilla
*Assistant Examiner*—Marvin P. Crenshaw
(74) *Attorney, Agent, or Firm*—Blakely Sokoloff Taylor & Zafman

(57) ABSTRACT

A driving apparatus in a printing press includes a plate cylinder driven by a printing press motor, an inking device drive-coupled to the plate cylinder, and a driving connecting/disconnecting mechanism. The mechanism connects and disconnects transmission of driving from the plate cylinder to the inking device, and includes first and second gears which are engageable with each other, supported rotatably, and constantly drive-coupled to one and the remaining one, respectively, of the plate cylinder and inking device. The second gear has a second engaging portion engageable with a plurality of first engaging portions of the first gear which have the same shape and are equidistantly arranged in a rotational direction of the first gear. When the first and second engaging portions engage, the plate cylinder and inking device are drive-coupled; when they are disengaged, they are disconnected. The number of first engaging portions is set on the basis of a value related to the first gear, so that when the plate cylinder reaches a phase identical to that where the first and second engaging portions disengage, the first and second engaging portions can engage regardless of a driving connection ratio of one of the plate cylinder and inking device to the first gear.

5 Claims, 12 Drawing Sheets

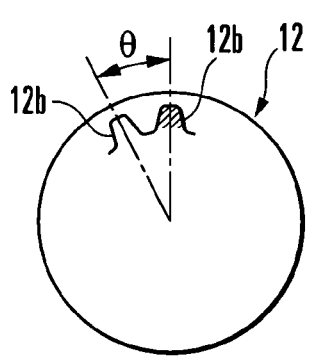 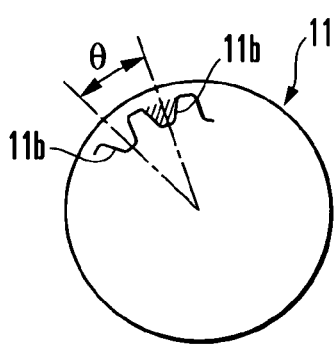 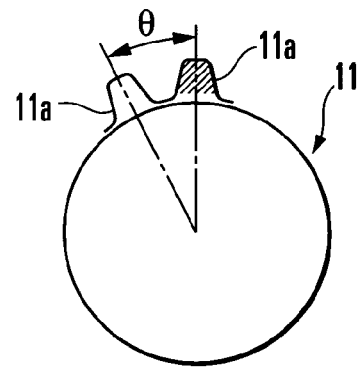
FIG. 7A   FIG. 7B   FIG. 7C
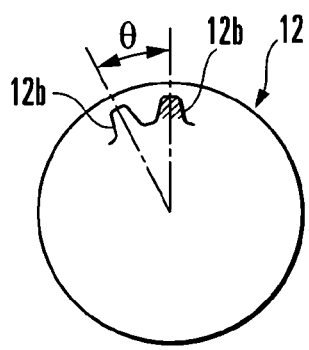 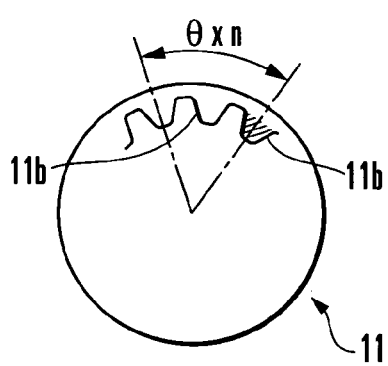 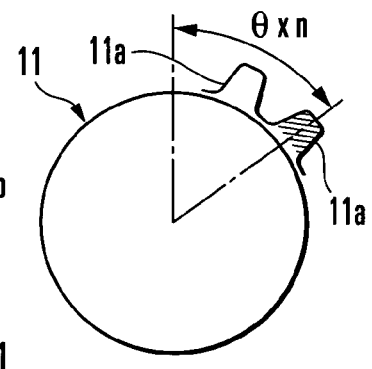
FIG. 8A   FIG. 8B   FIG. 8C

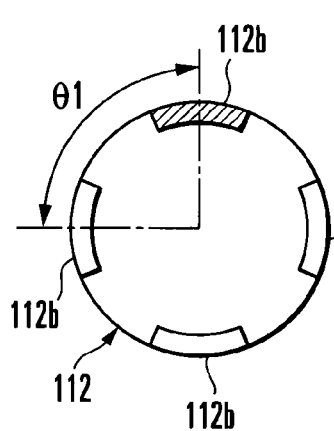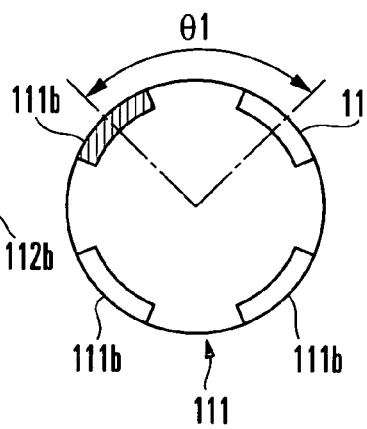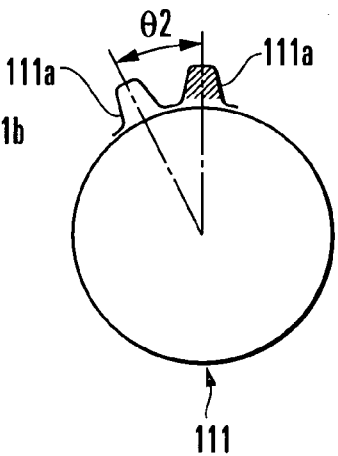
FIG.14A　　FIG.14B　　FIG.14C
PRIOR ART　PRIOR ART　PRIOR ART
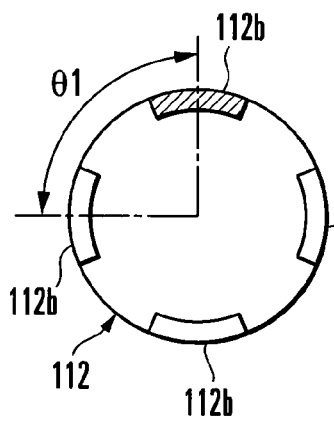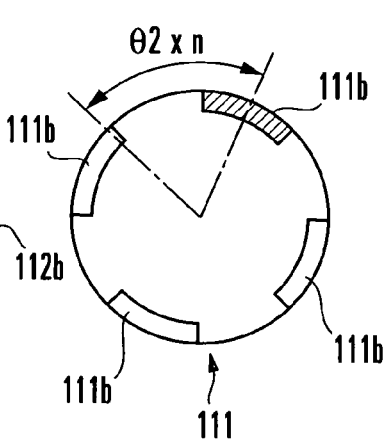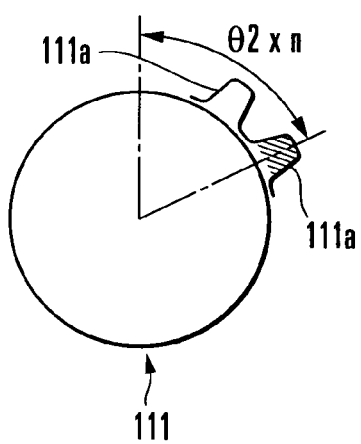
FIG.15A　　FIG.15B　　FIG.15C
PRIOR ART　PRIOR ART　PRIOR ART

DRIVING APPARATUS IN PRINTING PRESS

BACKGROUND OF THE INVENTION

The present invention relates to a driving apparatus for driving an inking device or dampening unit arranged in the printing unit of a multicolor printing press or a perfector.

In a multicolor printing press, depending on the number of colors to be printed, all the printing units need not be driven, and sometimes only some of a plurality of printing units are driven. In this case, in order to stop driving an inking device or dampening unit in a printing unit which is not to be driven, a driving connecting/disconnecting means for connecting/disconnecting a driving source to/from the inking device or dampening unit is provided to each printing unit.

In order to prevent degradation of the quality of the printing product, the relationship between the phase of a plate cylinder and the phase of an ink reciprocating roller during disconnection effected by the driving connecting/disconnecting means must be correctly reproduced during connection. For this purpose, as shown in Japanese Utility Model Registration No. 2537504, a conventional multicolor printing press includes a rotary encoder which detects the phase of the reciprocating motion of an ink reciprocating roller and the phase of a plate cylinder during disconnection effected by a driving connecting/disconnecting means, and a controller which stores the detected phases.

FIGS. 12 to 15 show a driving connecting/disconnecting mechanism employed by a driving apparatus in a conventional printing press. Referring to FIG. 12, a driving gear 106 axially mounted on the end shaft of a plate cylinder is connected to a printing press motor serving as a driving source. When the printing press motor is driven, the plate cylinder rotates through the driving gear 106. A first gear 111 is rotatably, axially supported by a shaft 114 extending perpendicularly from a frame 102, such that the movement of the first gear 111 in the axial direction is regulated.

The first gear 111 has 34 teeth 111a which constantly mesh with 70 teeth 106a of the driving gear 106. Four first engaging projections 111b are formed on the side surface of the first gear 111 equiangularly in the rotational direction of the first gear 111. A tooth-to-tooth angle $\theta2$ (FIG. 14C) between the two adjacent teeth 111a of the first gear 111 and a projection-to-projection angle $\theta1$ (FIG. 14B) between the two adjacent engaging projections 111b are largely different from each other. The angle $\theta2$ is not an integer multiple of the angle $\theta1$.

Referring to FIG. 12, a second gear 112 is rotatably and axially movably supported by an end 114a of the shaft 114 such that it is axially supported to be coaxial with the first gear 111. Teeth 112a which constantly mesh with teeth 124a of a driven gear 124 are formed on the circumferential surface of the second gear 112, and engaging projections 112b which engage with the engaging projections 111b of the first gear 111 project from the side surface of the second gear 112. As shown in FIG. 14A, the four engaging projections 112b are provided equiangularly with an angle $\theta1$ in the circumferential direction. The driven gear 124 meshes with a gear (not shown) that drives the ink roller of the inking device. When the printing press motor is driven, the plate cylinder rotates, and simultaneously the ink roller is driven in synchronism through the driving gear 106, first and second gears 111 and 112, and driven gear 124.

Referring to FIG. 12, an air cylinder 113 is attached, through an auxiliary bracket 117, to a bracket 116 fixed to oppose the frame 102. The second gear 112 is mounted on a rod 118 which is driven by the air cylinder 113 to move reciprocally. In this arrangement, when the rod 118 of the air cylinder 113 moves forward, the engaging projections 112b of the second gear 112 engage with the engaging projections 111b of the first gear 111. When the rod 118 of the air cylinder 113 moves backward, the engaging projections 112b of the second gear 112 and the engaging projections 111b of the first gear 111 disengage from each other.

In the former prior art, the driving source and the ink reciprocating roller are connected to and disconnected from each other by an electromagnetic clutch. Therefore, to transmit driving accurately, the surface pressures of clutch plates must be high. This increases the capacity of the electromagnetic device, leading to a high cost.

In the latter prior art, the driving force is transmitted by engaging the engaging projections 111b and 112b of the first and second gears 111 and 112, respectively, with each other. In this case, as the pressure of the air of the air cylinder 113 can be decreased comparatively low, the cost does not become high. However, the number (34) of teeth 111a of the first gear 111 and the number (70) of teeth 106a of the driving gear 106 that meshes with the first gear 111 are different from each other. Thus, after the first and second gears 111 and 112 are disconnected from each other, when they are to be connected again, their engaging projections 111b and 112b cannot engage with each other again.

This will be described. Immediately after the first and second gears 111 and 112 are disconnected, the four engaging projections 112b of the second gear 112 shown in FIG. 14A and the engaging projections 111b of the first gear 111 shown in FIG. 14B are in such a phase that they can engage with each other. At this time, the hatched tooth 111a in FIG. 14C shows the expedient disconnecting phase in the rotational direction of the first gear 111.

While the first and second gears 111 and 112 are disconnected from each other, because the driving gear 106 rotates, the first gear 111 meshing with the gear 106 also rotates. When the first and second gears 111 and 112 are to be connected to each other again, the printing press motor is stopped at a phase of the plate cylinder which is the same as that for disconnection. Thus, the driving gear 106 is stopped at the same phase as that for disconnection.

The number of teeth of the driving gear 106 and that of the first gear 111 meshing with the driving gear 106 are different. Thus, sometimes the teeth 111a of the first gear 111 are not located at the same phase as that for disconnection. In other words, the number i of revolutions of the first gear 111 per revolution of the plate cylinder 1 is 70/34. Even when the driving gear 106 is located at the same phase as that for disconnection, the first gear 111 is not located at the disconnection phase nearly always. In this case, the teeth 111a stop at positions shifted by a phase which is an integer multiple of the angle $\theta2$.

Accordingly, the engaging projections 111b of the first gear 111 also stop at the phase shifted from the disconnection phase by an angle which is an integer multiple of the angle $\theta2$ (FIG. 14B). As described above, the angle $\theta1$ is different from the angle $\theta2$, and the angle $\theta2$ is not an integer multiple of the angle $\theta1$. Thus, the phase of the engaging projections 111b of the first gear 111 stopped at the phase shifted by the integer multiple of the angle $\theta2$ is located at a phase different from the disconnection phase. For this reason, the phase of the engaging projections 111b of the first gear 111 do not match the phase of the engaging projections 112b of the second gear 112, and the engaging projections 111b and 112b cannot engage with each other again.

SUMMARY OF THE INVENTION

It is an object of the present invention to provide an inexpensive driving apparatus for a printing press which can transmit a driving force reliably.

In order to achieve the above object, according to the present invention, there is provided a driving apparatus in a printing press, including a first driven device driven by a driving source, a second driven device drive-coupled to the first driven device, and a driving connecting/disconnecting mechanism which connects and disconnects transmission of driving from the first driven device to the second driven device, the driving connecting/disconnecting mechanism including a first engaging member supported rotatably and constantly drive-coupled to one of the first and second driven devices, the first engaging member having a plurality of first engaging portions, and a second engaging member supported rotatably, constantly drive-coupled to the remaining one of the first and second driven devices, and engageable with the first engaging member, the second engaging member having a second engaging portion engageable with the first engaging portions, wherein the first engaging portions have the same shape and are equidistantly arranged in a rotational direction of the first engaging member, when the first and second engaging portions engage, the first and second driven devices are drive-coupled, and when the first and second engaging portions disengage, drive coupling of the first and second driven devices is disconnected, and the number of the first engaging portions is set on the basis of a value related to the first engaging member, so that when the first driven device reaches a phase identical to that where the first and second engaging portions disengage, the first and second engaging portions can engage regardless of a driving connection ratio of one of the first and second driven devices to the first engaging member.

BRIEF DESCRIPTION OF THE DRAWINGS

FIGS. 7A, 7B, and 7C are schematic diagrams for explaining the relationship among the phases of the inner and outer teeth of the first gear and of the teeth of the second gear of the driving apparatus shown in FIG. 1, to show a state immediately after the inner teeth of the first gear and the teeth of the second gear disengage from each other;

FIGS. 8A, 8B, and 8C are schematic diagrams for explaining the relationship among the phases of the inner and outer teeth of the first gear and of the teeth of the second gear of the driving apparatus shown in FIG. 1, to show a state when the inner teeth of the first gear and the teeth of the second gear mesh with each other again;

FIGS. 14A, 14B, and 14C are schematic diagrams for explaining the relationship among the phases of the engaging projections and teeth of the first gear and of the engaging projections of the second gear in the conventional driving connecting/disconnecting mechanism, to show a state immediately after the first and second engaging projections disengage from each other; and FIGS. 15A, 15B, and 15C are diagrams showing an undesired state wherein the first engaging projections engage with the second engaging projections again in the conventional driving connecting/disconnecting mechanism.

DESCRIPTION OF THE PREFERRED EMBODIMENTS

The present invention will be described in detail with reference to the accompanying drawings.

Figure 1:
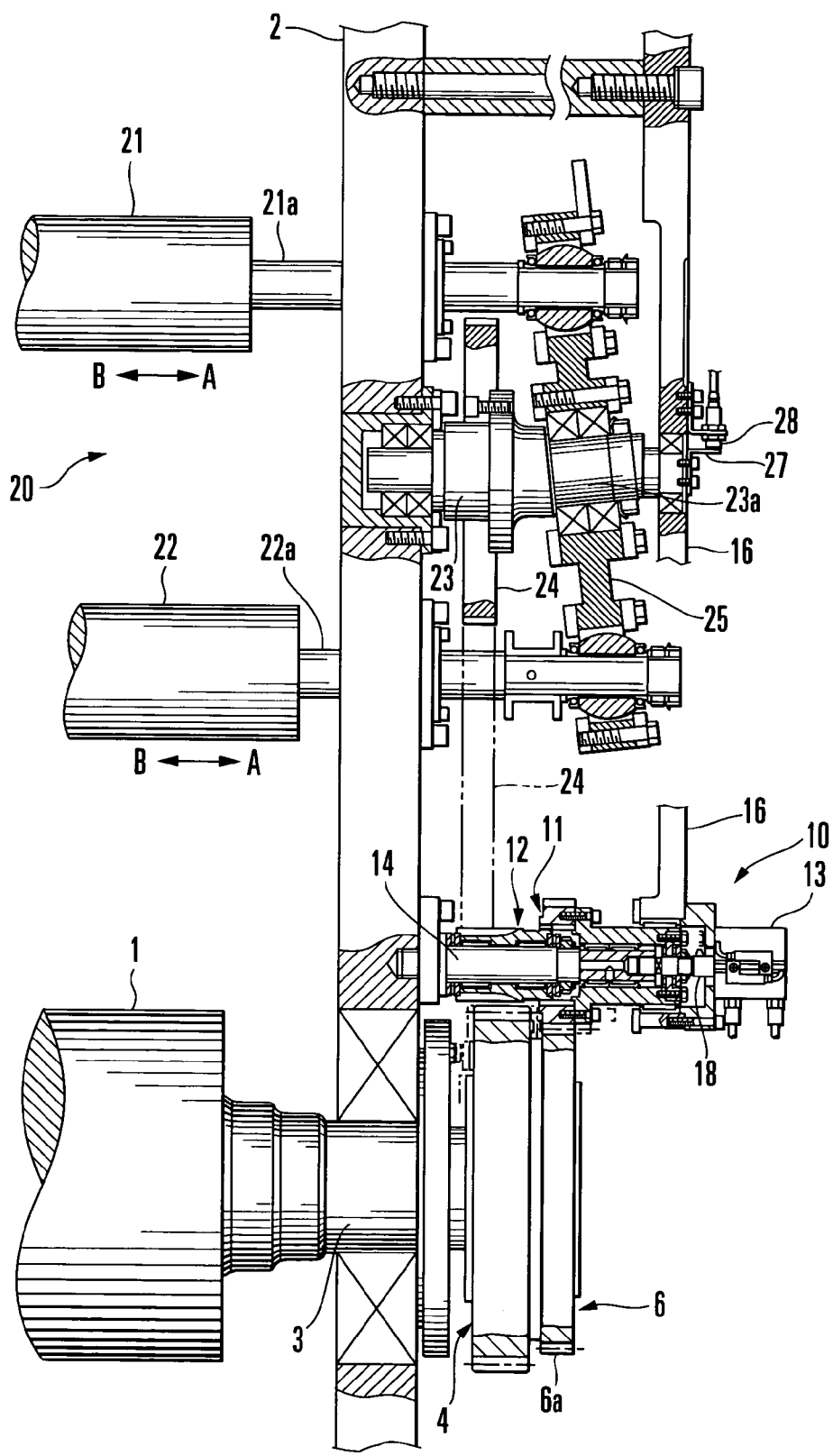
FIG. 1 is a partially cutaway front view of a driving apparatus in a printing press according to the first embodiment of the present invention.

FIGS. 1 to 8C show a driving apparatus in a printing press according to the first embodiment of the present invention. As shown in FIG. 1, a plate cylinder 1 serving as the first driven device is rotatably supported by a pair of frames 2 (one frame is not shown) which oppose end shafts 3. A driving gear 4 which is rotated by a printing press motor 5 (FIG. 5) serving as a driving source is axially mounted on the projecting end of the end shaft 3 projecting from the frame 2. An intermediate gear 6 is integrally formed with the driving gear 4. The intermediate gear 6 has "70" teeth 6a on its circumferential surface.

Figure 3:
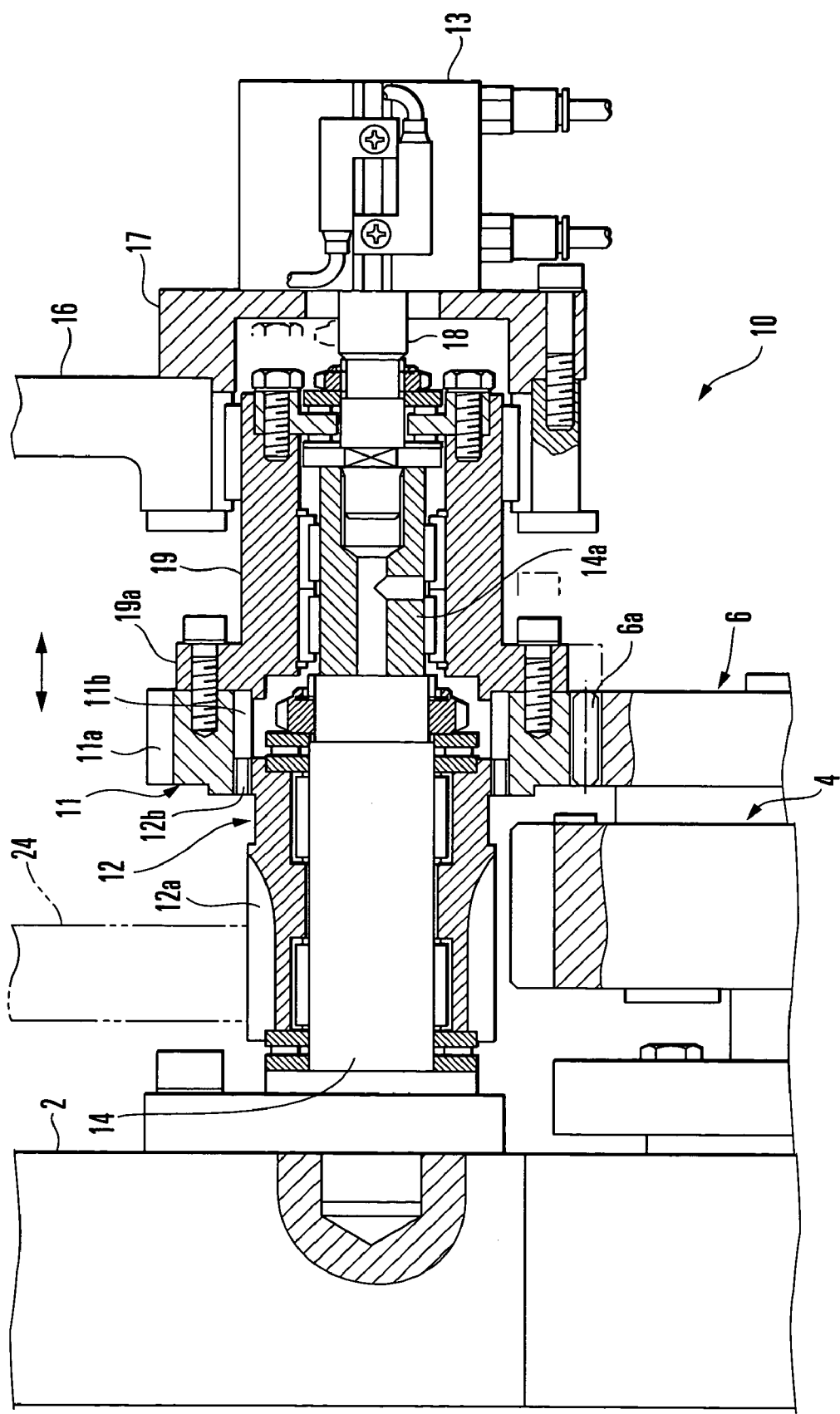
FIG. 3 is a partially cutaway front view of the main part of the driving apparatus shown in FIG. 1.

As shown in FIG. 3, a driving connecting/disconnecting mechanism 10 includes a ring-like first gear 11 serving as the first engaging member which constantly meshes with the intermediate gear 6, a second gear 12 serving as the sleeve-like second engaging member which meshes with the first gear 11, and an air cylinder 13 serving as a clutch actuator which meshes and disengages the first gear 11 with and from the second gear 12.

The second gear 12 is rotatably supported by a shaft 14 extending perpendicularly from the frame 2, such that the movement of the second gear 12 in the axial direction is regulated. Teeth 12a which constantly mesh with a driven gear 24 (to be described later) are formed on the frame-side portion of the second gear 12. Teeth 12b serving as "34"

second engaging portions having a small face width are formed on the counter-frame-side portion of the second gear 12.

Figure 4A:
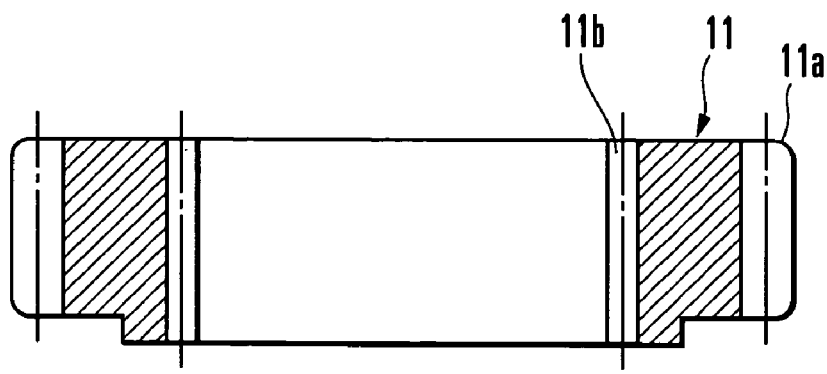
FIGS. 4A and 4B are a side sectional view and bottom view, respectively, of the first gear of the driving apparatus shown in FIG. 1.
Figure 4B:
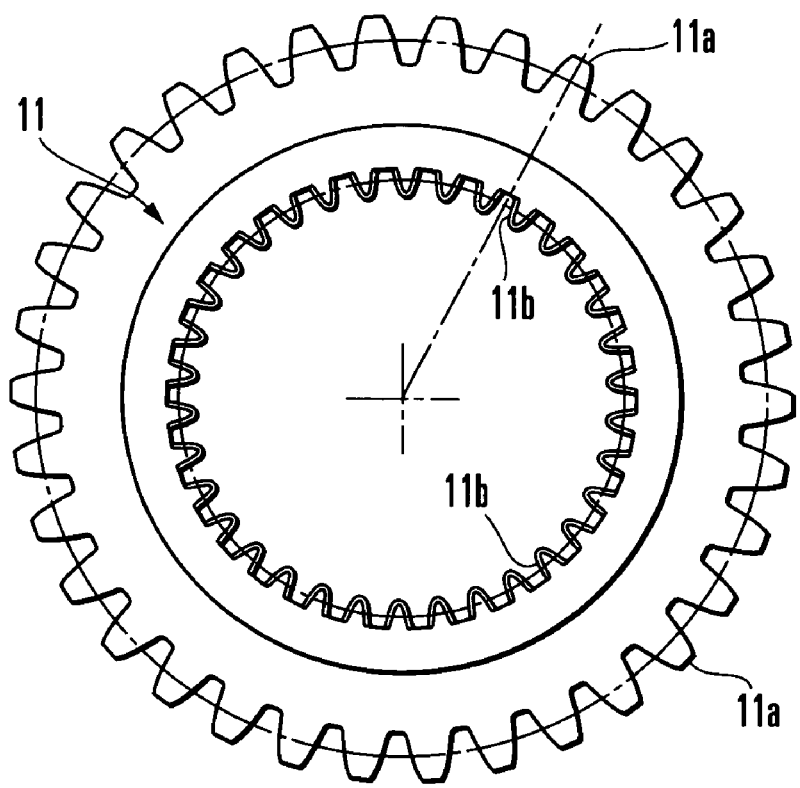

As shown in FIG. 4A, the first gear 11 has outer teeth 11a formed on its outer surface to constantly mesh with the teeth 6a of the intermediate gear 6, and inner teeth 11b formed on its inner surface and serving as the first engaging portion to mesh with teeth 12b (first engaging portion) of the second gear 12. The number of inner teeth 11b is "34", which is identical to the number of outer teeth 11a. As shown in FIG. 4B, the outer and inner teeth 11a and 11b are formed to be related to each other so that the position in the gear rotational direction, i.e., the phase, of the "34" inner teeth 11b and the phase of the "34" outer teeth 11a match each other.

As shown in FIG. 3, the air cylinder 13 is fixed through an auxiliary bracket 17 to the bracket 16 attached to the frame 2. A substantially cylindrical moving member 19 having a flange 19a at its one end is rotatably and axially movably supported by an end 14a of the shaft 14 through a bearing. The movement of the moving member 19 in the axial direction is regulated by a rod 18 of the air cylinder 13.

The first gear 11 is fixed to the outer side surface of the flange 19a of the moving member 19. When the rod 18 of the air cylinder 13 moves forward, the first gear 11 is moved through the moving member 19 in a direction to come close to the frame 2. Thus, the inner teeth 11b of the first gear 11 mesh with the teeth 12b of the second gear 12, and the rotation of the intermediate gear 6 is transmitted to the second gear 12 through the first gear 11. When the rod 18 of the air cylinder 13 is moved backward, the inner teeth 11b of the first gear 11 and the teeth 12b of the second gear 12 disengage from each other, and the transmission of rotation from the intermediate gear 6 to the second gear 12 is disconnected.

As shown in FIG. 1, an inking device 20 serving as the second driven device has two oscillating rollers 21 and 22 which supply ink in an ink fountain (not shown) to a plurality of ink rollers (not shown). Shafts 21a and 22a of the rollers 21 and 22 are axially movably and rotatably supported by the frame 2 through bearings (not shown). The driven gear 24 which constantly meshes with the second gear 12 is axially mounted on a rotation transmitting shaft 23 having two ends rotatably supported by the frame 2 and a bracket 16. For the descriptive convenience, the driven gear 24 which constantly meshes with the second gear 12 is indicated by an alternate long and two short dashed line.

The rotation transmitting shaft 23 has, at its projecting end portion, an oscillating shaft end 23a having an inclined axis. The central portion of a driving oscillating lever 25 is rotatably fitted on the oscillating shaft end 23a such that the oscillating lever 25 will not disengage in the axial direction of the oscillating shaft end 23a. The two ends of the driving oscillating lever 25 engage with the distal ends of the shafts 21a and 22a of the oscillating rollers 21 and 22, respectively, such that the driving oscillating lever 25 will not disengage in the axial direction.

Figure 2:
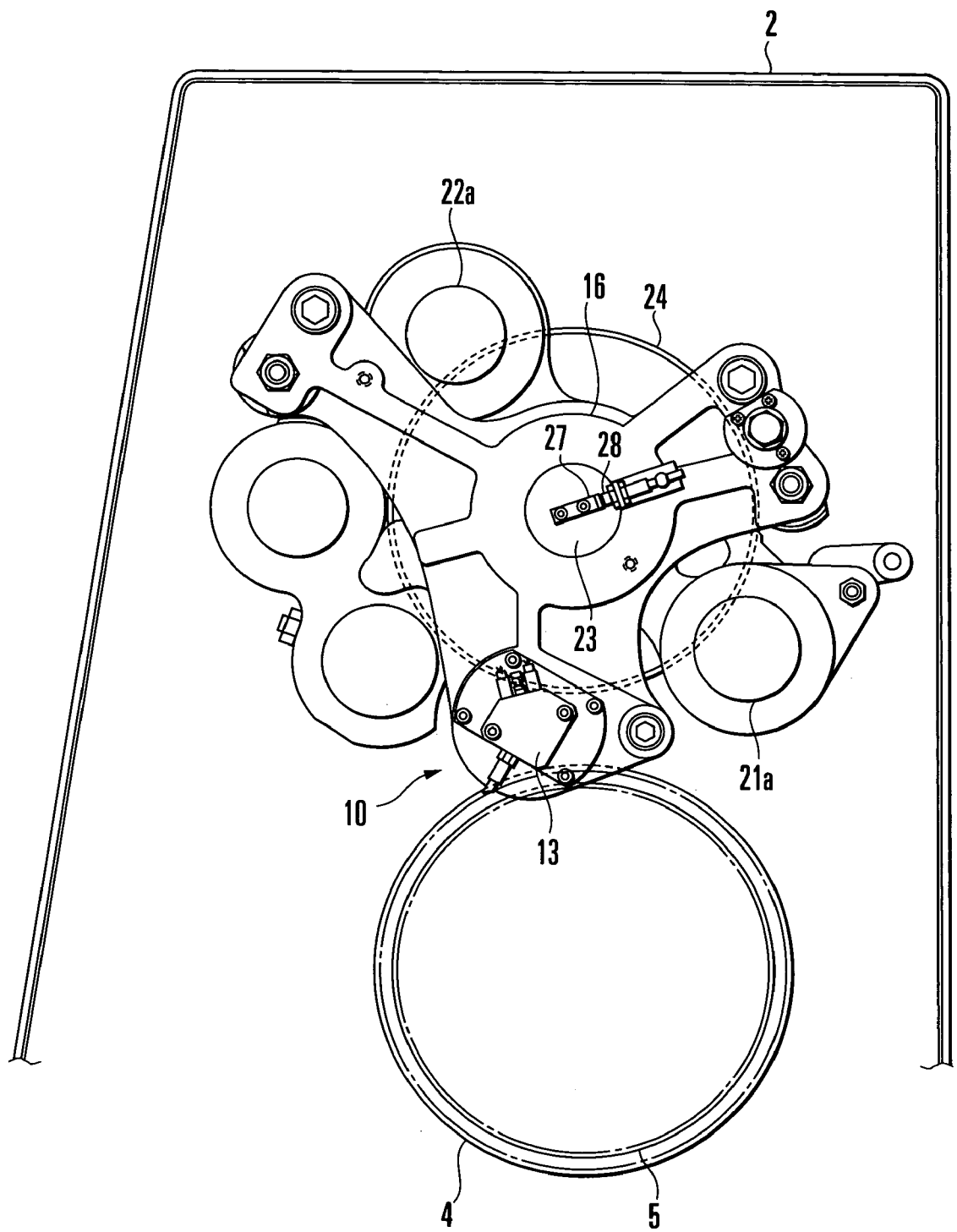
FIG. 2 is a side view of the driving apparatus shown in FIG. 1.
Figure 5:
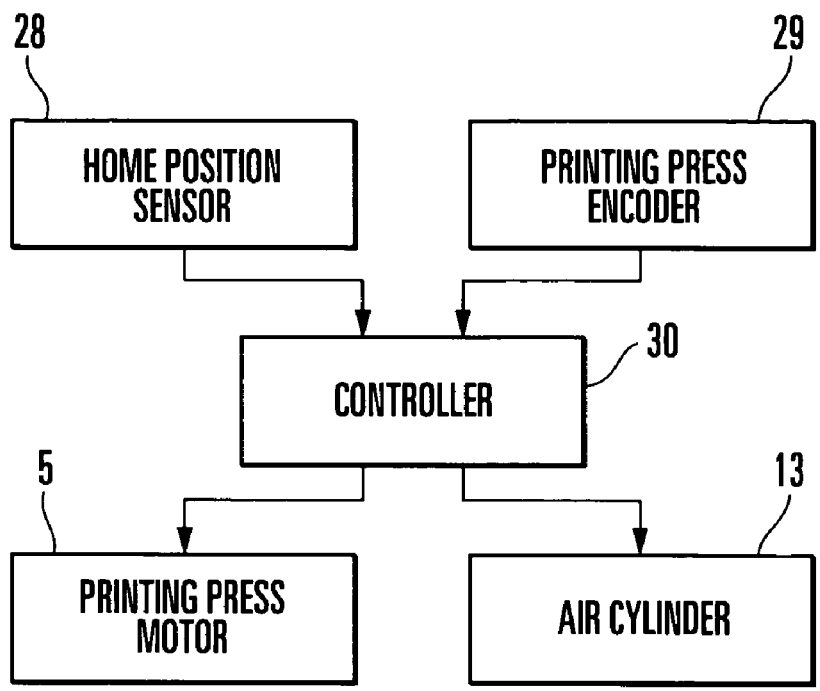
FIG. 5 is a block diagram showing the configuration of the driving apparatus shown in FIG. 1.

As shown in FIG. 2, a dog 27 serving as a detector is fixed to the end face of the rotation transmitting shaft 23. A home position sensor 28 which detects the dog 27 is attached to the bracket 16. As shown in FIG. 5, the printing press motor 5 which drives the printing press, the air cylinder 13 described above, the home position sensor 28 which detects the dog 27, and a printing press encoder 29 which detects the phase of the printing press are connected to a controller 30. When the home position sensor 28 detects the dog 27, the phase of the printing press detected by the printing press encoder 29 is stored. When the driving connecting/disconnecting mechanism 10 is to be connected on the basis of the stored phase, the controller 30 controls the driving operation of the printing press motor 5 and air cylinder 13.

The operation of the driving apparatus having the above arrangement will be described.

During printing, as shown in FIG. 3, the rod 18 of the air cylinder 13 moves forward, and the inner teeth 11b of the first gear 11 mesh with the teeth 12b of the second gear 12. In FIG. 1, when the printing press motor 5 drives to rotate the driving gear 4, the plate cylinder 1 rotates. The rotation of the driving gear 4 is transmitted to the second gear 12 through the intermediate gear 6 and first gear 11. Thus, the driven gear 24 and rotation transmitting shaft 23 meshing with the second gear 12 rotate.

When the rotation transmitting shaft 23 rotates, the two ends of the driving oscillating lever 25, the central portion of which is rotatably fitted on the oscillating shaft end 23a, move in directions to come close to and separate from the frame 2 alternately. Accordingly, the oscillating rollers 21 and 22 also reciprocally move alternately in the axial direction (the directions of arrows A–B).

In a printing unit which is not to be used, the printing press motor 5 keeps driving until the home position sensor 28 detects the dog 27. When the home position sensor 28 detects the dog 27, the controller 30 controls to stop the driving operation of the printing press motor 5. At this time, the phase of the printing press is detected by the printing press encoder 29, and the detected phase, i.e., the phase during disconnection of the driving connecting/disconnecting mechanism 10, is stored in the controller 30. Simultaneously, the controller 30 moves the rod 18 backward as an inoperative state of the air cylinder 13. Thus, the inner teeth 11b of the first gear 11 and the teeth 12b of the second gear 12 disengage from each other, and the first and second gears 11 and 12 are disconnected from each other. Therefore, the driving operation of the printing press motor 5 to the rotation transmitting shaft 23 is disconnected, so that the reciprocal movement of the oscillating rollers 21 and 22 is stopped.

Figure 6:
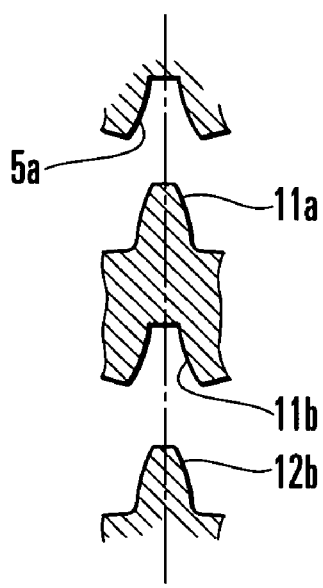
FIG. 6 is a schematic view showing the positional relationship among the tooth of a gear on a plate cylinder side, the outer and inner teeth of the first gear, and the tooth of the second gear when the driving connecting/disconnecting mechanism shown in FIG. 3 effects connection.

Immediately after the first and second gears 11 and 12 are disconnected, the phase (FIG. 7A) of the teeth 12b of the second gear 12 and the phase (FIG. 7B) of the inner teeth 11b of the first gear 11 match each other, as shown in FIG. 6. In other words, the inner teeth 11b and teeth 12b establish such a phase relationship that they can engage with each other. At this time, the hatched outer tooth 11a (FIG. 7C) indicates the expedient phase of the first gear 11 where the first and second gears 11 and 12 are disconnected from each other.

In this state, when the printing press motor 5 is driven, printing operation is performed in a printing unit which is to be used. In a printing unit which is not to be used, the plate cylinder 1 rotates, and the reciprocal movement of the oscillating rollers 21 and 22 is stopped, so the printing operation is not performed. At this time, the first gear 11 which constantly meshes with the intermediate gear 6 is driven by the printing press motor 5 to rotate.

When the printing unit which is not in use is to be used again, the controller 30 detects the stored phase of the printing press in response to an output from the printing press encoder 29. When the phase of the printing press becomes identical to the disconnection phase of the driving connecting/disconnecting mechanism 10, the controller 30 stops the printing press motor 5.

At this time, the number of teeth 6a of the intermediate gear 6 and that of the outer teeth 11a of the first gear 11 differ, and accordingly the phase of the first gear 11 is sometimes shifted. More specifically, as indicated by the hatched outer tooth 11a, sometimes the first gear 11 is located at a phase (FIG. 8C) which is shifted from the phase (FIG. 7C) the first and second gears 11 and 12 are disconnected by an angle which is an integer multiple of θ. Accordingly, the inner teeth 11b of the first gear 11 are also located at a phase (FIG. 8B) which is shifted from the phase (FIG. 7B) where the first and second gears 11 and 12 are disconnected by an angle which is an integer multiple of θ.

The adjacent inner teeth 11b of the first gear 11 are formed to have a tooth-to-tooth angle θ which is equal to the tooth-to-tooth angle of the adjacent outer teeth 11a. Accordingly, when the first and second gears 11 and 12 are connected to each other again, the phase (FIG. 8B) of the inneer teeth 11b of the first gear 11 match the phase (FIG. 7B) of the inner teeth 11b where the first and second gears 11 and 12 are disconnected. Therefore, when the first and second gears 11 and 12 are to be connected to each other again, the relationship between the phase (FIG. 8B) of the inner teeth 11b of the first gear 11 and the phase (FIG. 8A) of the teeth 12b of the second gear 12 establishes the same phase relationship as that shown in FIGS. 7A and 7B which is where the first and second gears 11 and 12 are disconnected. More specifically, the inner teeth 11b of the first gear 11 and the teeth 12b of the second gear 12 oppose each other to be able to mesh with each other, in the same manner as in a case wherein the first and second gears 11 and 12 are disconnected from each other.

In this state, when the rod 18 of the air cylinder 13 moves forward, the inner teeth 11b of the first gear 11 and the teeth 12b of the second gear 12 reliably mesh with each other. Thus, the driving operation of the printing press motor 5 is reliably transmitted to the driven gear 24 of the inking device 20 through the driving connecting/disconnecting mechanism 10, and printing operation is started.

In this manner, connection and disconnection by the driving connecting/disconnecting mechanism 10 are performed by meshing/disengaging the inner teeth 11b of the first gear 11 and the teeth 12b of the second gear 12 with/from each other. In this manner, as the driving force of the air cylinder 13 need not be increased, a relatively inexpensive air cylinder can be used as the air cylinder 13.

In the first embodiment described above, the phase of the each of the "34" inner teeth 11b in the rotational direction of the first gear 11 and the phase of each of the "34" outer teeth 11a match each other. However, the two phases need not match each other, and it suffices as far as the number of inner teeth 11b and that of the outer teeth 11a are equal. Alternatively, in place of the inner teeth 11b of the first gear 11, engaging portions such as engaging projections may be formed. In this case, the plurality of engaging portions have the same shape and are arranged equidistantly in the rotational direction of the first gear 11. The engaging portions may be formed in the same number as that of the outer teeth 11a of the first gear 11, and engaging portions engageable with these engaging portions may be formed on the second gear 12 as well.

The number of teeth 12b of the second gear 12 is equal to that of the inner teeth 11b of the first gear 11, that is, 34, but they need not be equal. For example, it suffices as far as the second gear 12 has at least "one" tooth 12b. The number of outer teeth 11a of the first gear 11 is equal to that of the inner teeth 11b, but even when the number of inner teeth 11b is an integer multiple of the number of outer teeth 11a, the same function and effect can be obtained. In this case, the number of outer teeth 11a corresponds to a value related to the first gear 11 (first engaging member).

The first gear 11 meshes with the driving gear 4 on the plate cylinder 1 side. Alternatively, the first gear 11 may mesh with the driven gear 24 on the inking device 20 side, and the second gear 12 may mesh with the driving gear 4. The second gear 12 has a plurality of teeth 12b, but it suffices as far as the second gear 12 has at least one tooth 12b to be able to mesh with any one of the plurality of inner teeth 11b of the first gear 11. The first gear 11 meshes with the intermediate gear 6 on the plate cylinder side. Alternatively, the first gear 11 may mesh with the driven gear 24 of the inking device 20, and the second gear 12 may mesh with the intermediate gear 6 on the plate cylinder side.

Figure 9A:
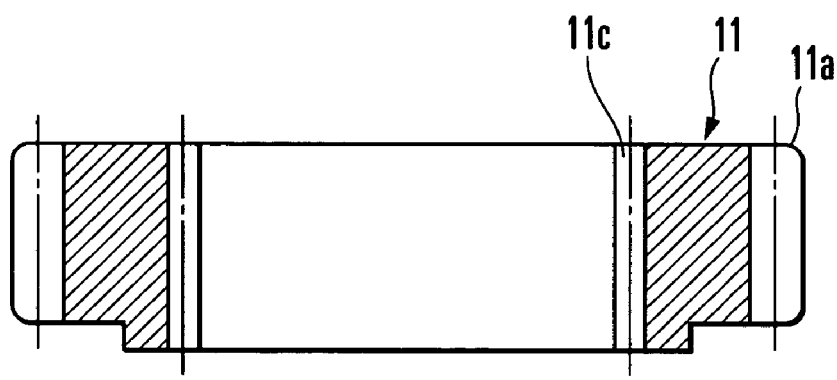
FIGS. 9A and 9B are a side sectional view and bottom view, respectively, of a first gear serving as a first engaging member according to the second embodiment of the present invention.
Figure 9B:
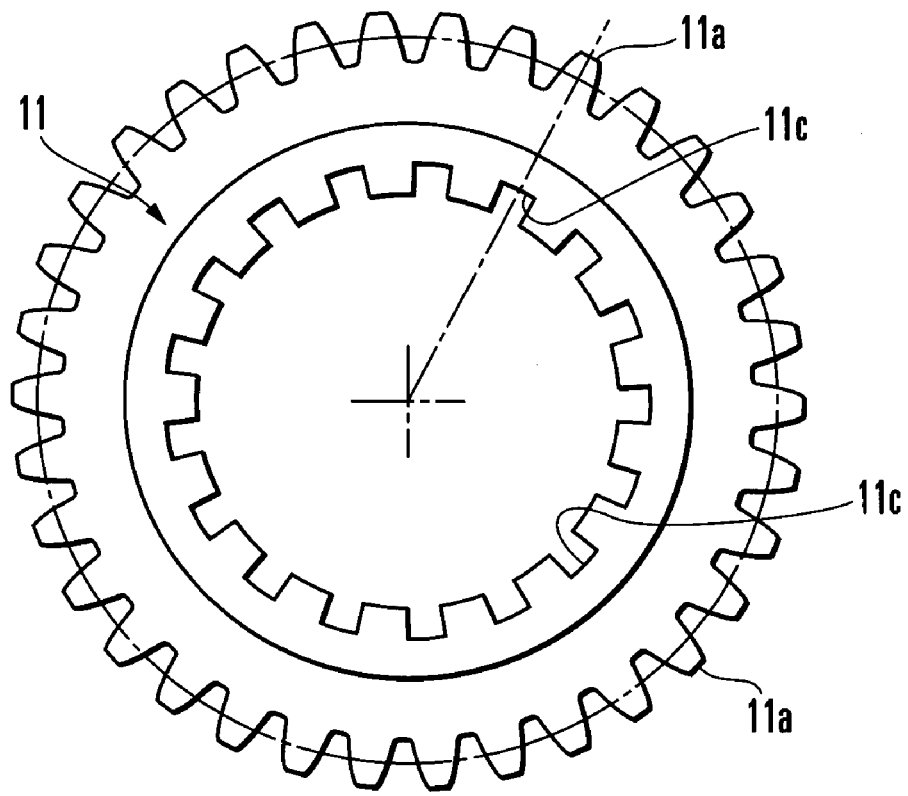

FIGS. 9A and 9B show the second embodiment of the present invention.

According to the second embodiment, as shown in FIGS. 9A and 9B, "17" spline grooves 11c are formed in the inner surface of a first gear 11, and teeth 12b of a second gear 12 that engage with the grooves 11c are spline teeth. The second embodiment is different from the first embodiment in these respects.

When the number of grooves 11c as the first engaging portion is determined on the basis of the number of revolutions of the first gear 11 per revolution of a plate cylinder 1, the grooves 11c of the first gear 11 are located at the same positions as those for disconnection, in the same manner as in the first embodiment. This will be described.

More specifically, assume that the number of revolutions of the first gear 11 per revolution of the plate cylinder 1 is defined as "i". When the plate cylinder 1 rotates by one revolution, the first gear 11 rotates by i revolutions. As described above, assume that an intermediate gear 6 is integrally formed with the plate cylinder 1 and that the first gear 11 meshes with the intermediate gear 6. When a number $Z_1$ of teeth 6a of the intermediate gear 6 is "70" and a number $Z_2$ of outer teeth 11a of the first gear 11 is "34", the number of revolutions of the first gear 11 per revolution of the plate cylinder 1 is $i=Z_1/Z_2=70/34$.

When the plate cylinder 1 rotates by one revolution, the first gear 11 rotates by i=70/34=35/17. In other words, when the plate cylinder 1 rotates by one revolution, the first gear 11 rotates by 2 and 1/17 revolutions, which is equivalent to an angle 35 times an angle obtained by equally dividing 360° by 17. Namely, when the plate cylinder 1 rotates by one revolution, the first gear 11 is shifted by an integer multiple of the angle obtained by equally dividing 360° by 17. As in the second embodiment, when the number of spline grooves 11c of the first gear 11 is set to "17", the grooves 11c can be positioned at the same positions as those for disconnection.

This will be applied to general consideration. The number i of revolutions of the first engaging portions per revolution of the cylinder can be expressed as i=B/A (A and B are integers). Assuming that the greatest common measure of A and B is N, i can be reduced as i=B/A=b*N/a*N=b/a where a̲ and b are relatively prime. This means that when the cylinder rotates by one revolution, the first engaging member is shifted by an integer multiple of an angle obtained by equally dividing 360° by a̲. Consequently, when the first engaging member has the first engaging portions in a̲ that equally divides 360° by a̲, or in an integer multiple of a̲, then the first engaging portions can be positioned at the same positions as those for disconnection. In this case, the number i of revolutions of the first engaging portions corresponds to a value related to the first gear 11 (first engaging member).

Figure 10:
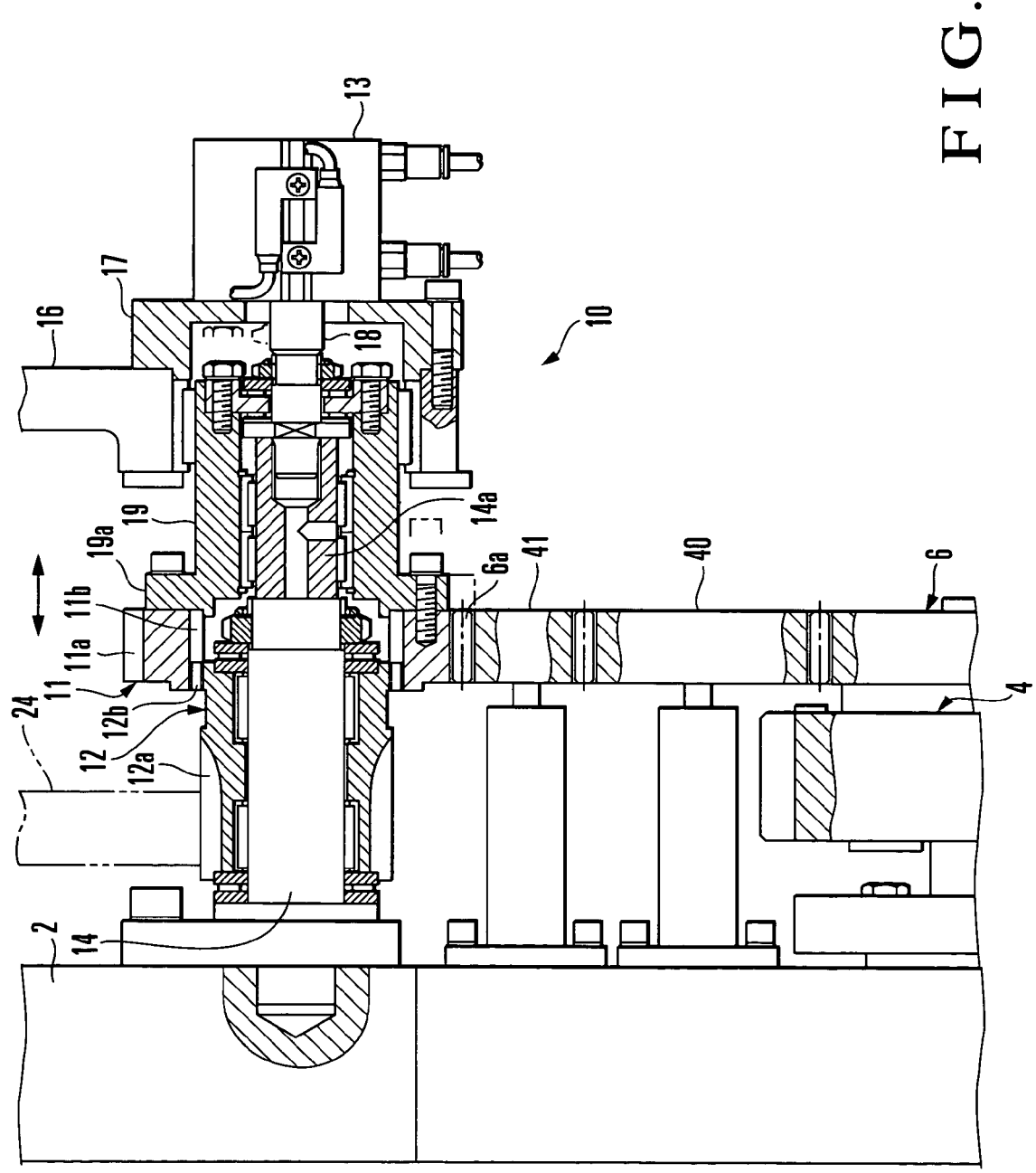
FIG. 10 is a partially cutaway enlarged front view showing the main part of a driving apparatus according to the third embodiment of the present invention.

FIG. 10 shows the third embodiment of the present invention.

According to the third embodiment, other intermediate gears 40 and 41 are interposed between a first gear 11 and an intermediate gear 6 which is integrally formed with a plate cylinder 1. In the third embodiment as well, in the same manner as in the second embodiment, when the number of inner teeth 11b of the first gear 11 is determined on the basis of the number i of revolutions of the first gear 11 per revolution of the plate cylinder 1, the same effect as that of the second embodiment can be obtained.

Figure 11A:
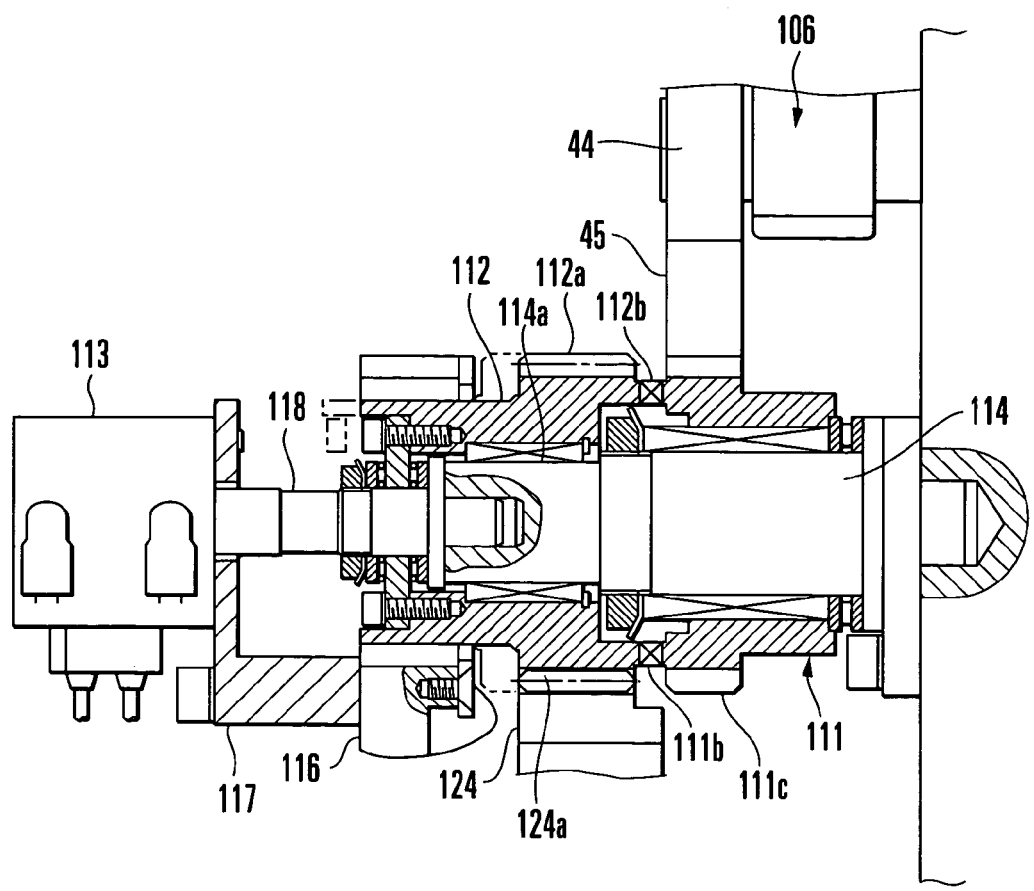
FIG. 11A is a partially cutaway enlarged front view of the main part of a driving apparatus according to the fourth embodiment of the present invention.
Figure 11B:
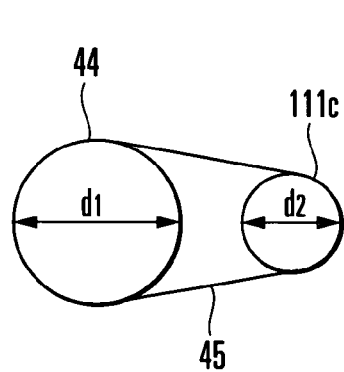
FIG. 11B is a model diagram for explaining the diameters of the pulleys shown in FIG. 11A.
Figure 11C:
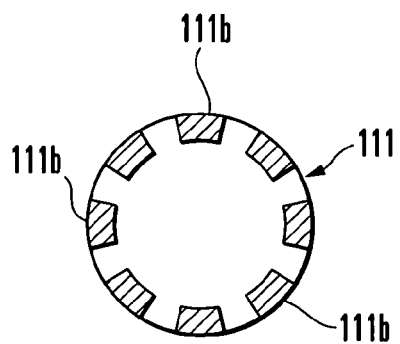
FIG. 11C is a model diagram for explaining the number of first engaging portions of the first engaging member shown in FIG. 11A.
Figure 12:
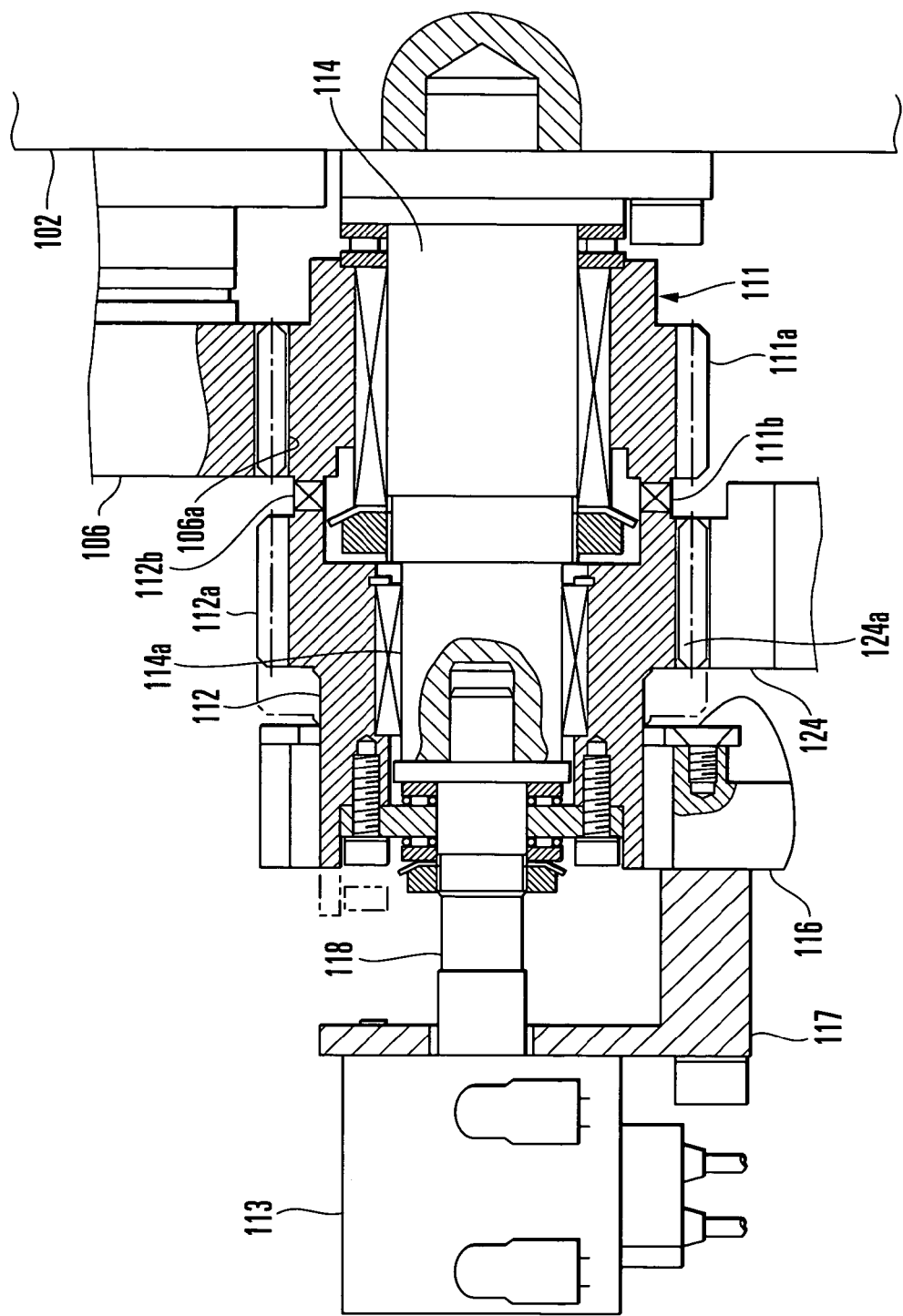
FIG. 12 is a partially cutaway front view of a driving connecting/disconnecting mechanism to be used by a driving apparatus in a conventional printing press.
Figure 13A:
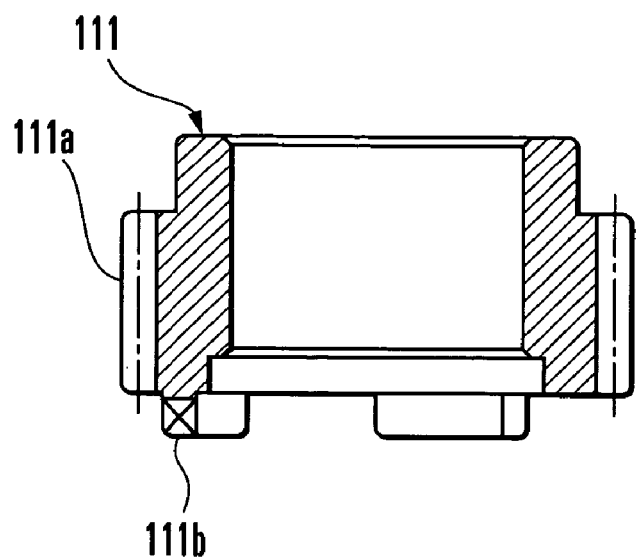
FIG. 13A is a side sectional view of the first gear of the conventional driving connecting/disconnecting mechanism shown in FIG. 13A.
Figure 13B:
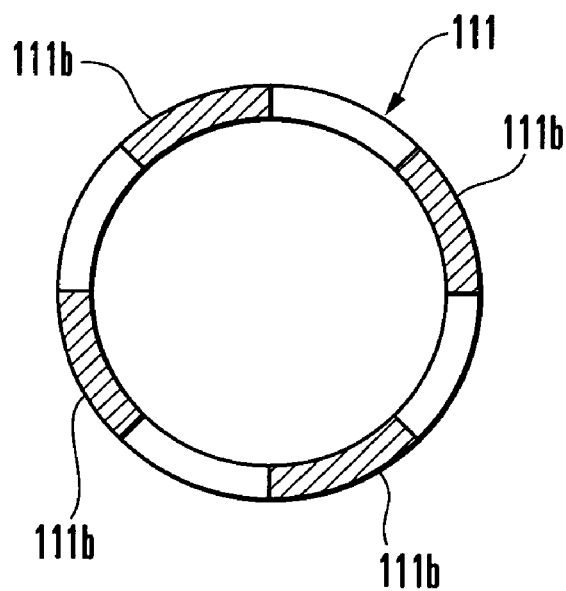
FIG. 13B is a bottom view showing the arrangement of first engaging projections.

FIGS. 11A to 11C show the fourth embodiment of the present invention. Referring to FIGS. 11A to 11C, the same or equivalent members as those described in the prior art shown in FIG. 12 are denoted by the same reference numerals, and a detailed description will be omitted when necessary.

According to the fourth embodiment, as shown in FIG. 11A, a gear 106 is integrally formed with a pulley 44, and a first engaging member 111 is integrally formed with a pulley 111c. A belt 45 extends between the pulleys 44 and 111c, as shown in FIG. 11B. The driving operation of a printing press motor 5 is transmitted to the first engaging member 111 through the belt 45.

In this case, the number i of revolutions of the first engaging member 111 per revolution of a plate cylinder 1 satisfies i=d1/d2 where d1 is the diameter of the pulley 44 and d2 is the diameter of the first pulley 111c. In this manner, "i" can also be calculated from the diameters of the pulleys. If the value of the reduction gear ratio is not expressed as a fraction, like i=2.125, "i" can be expressed as a fraction the numerator and denominator of which are integers that are relatively prime, like i=2125/1000=(17×125)/(8×125)=17/8. For example, in this case, as shown in FIG. 11C, the number of engaging projections 111b of the first engaging member 111 may be set to "8", so that the engaging projections 111b can be positioned at the same phase as that for disconnection. In this case, the number of engaging projections 111b may be set to "16" or "24", each of which is an integer multiple of 8.

In the above embodiments, the first driven device is the plate cylinder 1, and the second driven device is the inking device 20. Alternatively, the second driven device may be a dampening unit. The present invention can also be applied to a case wherein the first driven device is a printing press, the second driven device is a folder, and the driving operations of the two devices are connected and disconnected for the purpose of preparation of printing. Alternatively, the first driven device may be a printing press, and the second driven device may be a sheet feeder. Also, the first driven device may be a printing press, and the second driven device may be a delivery unit.

As has been described above, according to the present invention, the driving force can be connected reliably at a low cost.

What is claimed is:

1. A driving apparatus in a printing press, including: a first driven device driven by a driving source; a second driven device drive-coupled to said first driven device; and a driving connecting/disconnecting mechanism which connects and disconnects transmission of driving from said first driven device to said second driven device, said driving connecting/disconnecting mechanism including a first engaging member supported rotatably and constantly drive-coupled to one of said first and second driven devices, said first engaging member having a plurality of teeth formed on an outer surface thereof and drive-coupled to one of said first and second driven devices, and a plurality of first engaging portions which rotate together with said teeth, and a second engaging member supported rotatably, constantly drive-coupled to the remaining one of said first and second driven devices, and engageable with said first engaging member, said second engaging member having a second engaging portion engageable with said first engaging portions, wherein said first engaging portions have the same shape and are equidistantly arranged in a rotational direction of said first engaging member, when said first and second engaging portions engage, said first and second driven devices are drive-coupled, and when said first and second engaging portions disengage, drive coupling of said first and second driven devices is disconnected, and the number of said first engaging portions is set to a multiple integer of the number of said teeth.

2. An apparatus according to claim 1 wherein said first engaging portions are teeth of an inner-tooth gear formed on an inner surface of said first engaging member, and said second engaging portion is a tooth of an outer-tooth gear formed on an outer surface of said second engaging member.

3. An apparatus according to claim 1 wherein said first engaging portions are spline grooves formed in an inner surface of said first engaging member, and said second engaging portion is a spline tooth.

4. An apparatus according to claim 1 wherein said first driven device is a plate cylinder having a circumferential surface on which a printing plate is to be mounted, and said second driven device is an oscillating roller in an inking device which supplies ink to an ink roller.

5. A driving apparatus in a printing press, including: a first driven device driven by a driving source; a second driven device drive-coupled to said first driven device; and a driving connecting/disconnecting mechanism which connects and disconnects transmission of driving from said first driven device to said second driven device, said driving connecting/disconnecting mechanism including a first engaging member supported rotatably and constantly drive-coupled to one of said first and second driven devices, said first engaging member having a plurality of first engaging portions, and a second engaging member supported rotatably, constantly drive-coupled to the remaining one of said first and second driven devices, and engageable with said first engaging member, said second engaging member having a second engaging portion engageable with said first engaging portions, wherein said first engaging portions have the same shape and are equidistantly arranged in a rotational direction of said first engaging member, when said first and second engaging portions engage, said first and second driven devices are drive-coupled, and when said first and second engaging portions disengage, drive coupling of said first and second driven devices is disconnected, and the number of said first engaging portions is set to an integer multiple of an integer a that satisfies: $i=b/a$ where i is the number of revolutions of said first engaging member per revolution of said first driven device, and a and b are integers that are relatively prime.

* * * * *